(12) United States Patent  
Tsai

(10) Patent No.: US 9,477,027 B2  
(45) Date of Patent: Oct. 25, 2016

(54) BACK LIGHT STRUCTURE AND KEYBOARD WITH BACK LIGHT

(71) Applicants: DARFON ELECTRONICS (SUZHOU) CO., LTD., Suzhou, Jiangsu Province (TW); DARFON ELECTRONICS CORP., Taoyuan (TW)

(72) Inventor: Po-Wei Tsai, Taoyuan (TW)

(73) Assignees: DARFON ELECTRONICS (SUZHOU) CO., LTD., Suzhou, Jiangsu Province (CN); DARFON ELECTRONICS CORP., Taoyuan (TW)

( * ) Notice: Subject to any disclaimer, the term of this patent is extended or adjusted under 35 U.S.C. 154(b) by 382 days.

(21) Appl. No.: 14/160,485

(22) Filed: Jan. 21, 2014

(65) Prior Publication Data

US 2014/0204556 A1 Jul. 24, 2014

(30) Foreign Application Priority Data

Jan. 22, 2013 (TW) .............................. 102201365 U

(51) Int. Cl.
- *F21V 8/00* (2006.01)
- *H01H 13/83* (2006.01)
- *G06F 3/02* (2006.01)
- *H01H 3/12* (2006.01)

(52) U.S. Cl.
CPC ........... *G02B 6/0021* (2013.01); *G02B 6/0055* (2013.01); *G06F 3/0202* (2013.01); (Continued)

(58) Field of Classification Search
CPC ............... H01H 13/023; H01H 13/14; H01H 2219/036; H01H 13/70; H01H 2219/039; H01H 2219/048; H01H 2219/064; H01H 2223/03; H01H 3/12; H01H 13/83; H01H 2203/052; H01H 2219/044; H01H 2219/062; H01H 2219/06; H01H 2219/014; H01H 2227/036; H01H 2215/004; H01H 3/125; G06F 3/04883; G06F 3/023; G06F 3/016; G06F 3/0213; G06F 3/0238; G06F 3/0489; G06F 3/0219; G06F 3/0227; G06F 3/0231; G06F 3/0325; G06F 3/0202; F21Y 2101/02; F21S 2/005; F21V 19/0015; G01N 2201/06; G02B 6/0021; G02B 6/0073; G02B 6/0055; G02B 6/008; G02B 6/0028; G10C 3/12; H04N 9/3164

See application file for complete search history.

(56) References Cited

U.S. PATENT DOCUMENTS

2003/0121017 A1* 6/2003 Andreev ............. G06F 17/5077  
716/129

FOREIGN PATENT DOCUMENTS

| CN | 1598660 A | 3/2005 |
|---|---|---|
| CN | 101526694 A | 9/2009 |

(Continued)

*Primary Examiner* — Stephen F Husar  
*Assistant Examiner* — Danielle Allen  
(74) *Attorney, Agent, or Firm* — Winston Hsu; Scott Margo

(57) ABSTRACT

A back light structure for a keyboard with back light includes a supporting plate, a light guiding plate, a flexible circuit board, and a light-emitting component. Keyswitch structures of the keyboard are disposed on the supporting plate. The light guiding plate is disposed under the supporting plate and has a through hole and a lateral surface. The circuit board adheres onto both a lower surface of the light guiding plate and a bottom surface of the supporting plate and covers the lateral surface. The light-emitting component is disposed on the circuit board in the through hole. Thereby, the circuit board also performs as a light shading structure for the lateral surface. A light reflection sheet need not cover both the lateral surface and the circuit board for avoiding light leakage but adheres onto only the lower surface, conducive to reducing the structural thickness of the back light structure.

17 Claims, 4 Drawing Sheets

(52) U.S. Cl.
CPC ........... *H01H 13/83* (2013.01); *G02B 6/0083* (2013.01); *H01H 3/125* (2013.01); *H01H 2203/052* (2013.01); *H01H 2215/004* (2013.01); *H01H 2219/014* (2013.01); *H01H 2219/036* (2013.01); *H01H 2219/044* (2013.01); *H01H 2219/06* (2013.01); *H01H 2219/062* (2013.01); *H01H 2227/036* (2013.01)

(56) References Cited

FOREIGN PATENT DOCUMENTS

| CN | 202094015 U | 12/2011 |
| CN | 202601475 U | 12/2012 |

\* cited by examiner

BACK LIGHT STRUCTURE AND KEYBOARD WITH BACK LIGHT

BACKGROUND OF THE INVENTION

1. Field of the Invention

The invention relates to a back light structure and a keyboard with back light, and especially relates to a back light structure, whose light-emitting components are disposed inside its light guiding plate, and a keyboard with back light having the back light structure.

2. Description of the Prior Art

Conventional keyboards with back light usually use a light guiding plate with light-emitting components. If the light-emitting components are disposed inside the light guiding plate, for example in through holes formed insides the light guiding plate, a flexible circuit board electrically connected to the light-emitting components needs to be disposed under the light guiding plate. Furthermore, for increment of light usage, the keyboard with back light also includes a light reflection sheet which is also disposed under the light guiding plate. In order to avoid light leakage from a side edge of the light guiding plate, the light reflection sheet usually needs to totally cover the lower surface and all side edges of the light guiding plate. However, in such configuration, the light reflection sheet also needs to cover the flexible circuit board, leading to a relative protrusion of a portion of the light reflection sheet covering the flexible circuit board. That is, the thickness of the back light structure of the keyboard with back light at least includes a summation of the thicknesses at least of the light guiding plate, the flexible circuit board, and the light reflection sheet. Hence, in such back light configuration, the thickness summation becomes a bottleneck to thickness reduction.

SUMMARY OF THE INVENTION

An objective of the invention is to provide a back light structure, whose flexible circuit board also can be used as a structure for avoiding light leakage from edges of its light guiding plate so as to be conducive to reduction in a whole structural thickness, which overcomes the bottleneck in the conventional back light structure that it is difficult to reduce the structural thickness under the effect of thickness summation.

The back light structure of the invention is used in a keyboard with back light. The keyboard with back light includes a plurality of keyswitch structures. The back light structure includes a supporting plate, a light guiding plate, a flexible circuit board, and a light-emitting component. The supporting plate is used for supporting the plurality of the keyswitch structures has a bottom surface. The light guiding plate is disposed under the supporting plate and has a through hole, a lower surface and a lateral surface. The flexible circuit board adheres onto both the lower surface of the light guiding plate and the bottom surface of the supporting plate and covers the lateral surface. The light-emitting component is disposed on the flexible circuit board and located in the through hole. Thereby, the flexible circuit board also can be used as a light shading structure for the lateral surface of the light guiding plate, so a light reflection sheet need not cover the lateral surface of the light guiding plate and the flexible circuit board for avoiding light leakage but can adhere onto only the lower surface of the light guiding plate for performing reflecting light and avoiding light leakage. Such configuration is conducive to thickness reduction of the back light structure.

Another objective of the invention is to provide a keyboard with back light, which includes the back light structure of the invention. The keyboard with back light includes a supporting plate, a plurality of keyswitch structures, a light guiding plate, a flexible circuit board, and a light-emitting component. The supporting plate has a bottom surface. The keyswitch structures are disposed on the supporting plate. The light guiding plate is disposed under the supporting plate and has a through hole, a lower surface, and a lateral surface. The flexible circuit board adheres onto the lower surface of the light guiding plate and the bottom surface of the supporting plate at the same time and covers the lateral surface. The light-emitting component is disposed on the flexible circuit board and located in the through hole. Similarly, the flexible circuit board also can be used as a structure of avoiding light leakage from the lateral surface of the light guiding plate, which is conducive to a reduction in the whole structural thickness so as to overcome the bottleneck in the conventional back light structure that it is difficult to reduce the structural thickness due to the thickness summation.

Compared with the prior art, the back light structure and the keyboard with back light mentioned above directly use the flexible circuit board to cover the lateral surface of the light guiding plate. The light reflection sheet need not to cover the lateral surface of the light guiding plate and the flexible circuit board simultaneously for avoiding light leakage, i.e. from the light guiding plate, so the structural thickness of the backlight structure can be reduced. Therefore, under the requirement of avoiding light leakage, the back light structure and the keyboard with back light of the invention still can overcome the bottleneck in the conventional back light structure that it is difficult to reduce the structural thickness due to the summation of the thicknesses at least of the light guiding plate, the flexible circuit board, the light reflection sheet, and so on.

Another objective of the invention is to provide a keyboard with back light, which includes a supporting plate, a plurality of the keyswitch structures, a light guiding plate, a flexible circuit board, a light-emitting component, and a light reflection sheet. The keyswitch structures are disposed on the supporting plate. The light guiding plate is disposed under the supporting plate. A lower surface of the light guiding plate includes a first area and a second area. The first area is closely adjacent to the second area. The first area has a first through hole. The flexible circuit board substantially covers the whole first area. The light-emitting component is disposed on the flexible circuit board and located in the first through hole. The light-emitting component provides illumination light capable of entering the light guiding plate. The light reflection sheet substantially covers the whole second area. By use of the light reflection sheet and the flexible circuit board, the illumination light escaping from the first area and the second area of the light guiding plate can be reflected back to the light guiding plate, and substantially no light leaks out from a boundary formed between the light reflection sheet and the flexible circuit board. Compared with the prior art, the keyboard with back light can efficiently reflect the illumination light escaping from the first area and the second area of the light guiding plate back to the light guiding plate without overlapping of the light reflection sheet with the flexible circuit board, which is conducive to reduction in the structural thickness of the whole keyboard with back light so as to overcome the bottleneck in the conventional keyboard with back light that it is difficult to reduce the structural thickness due to the summation of the thicknesses at least of the light guiding plate, the flexible circuit board, the light reflection sheet, and so on.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
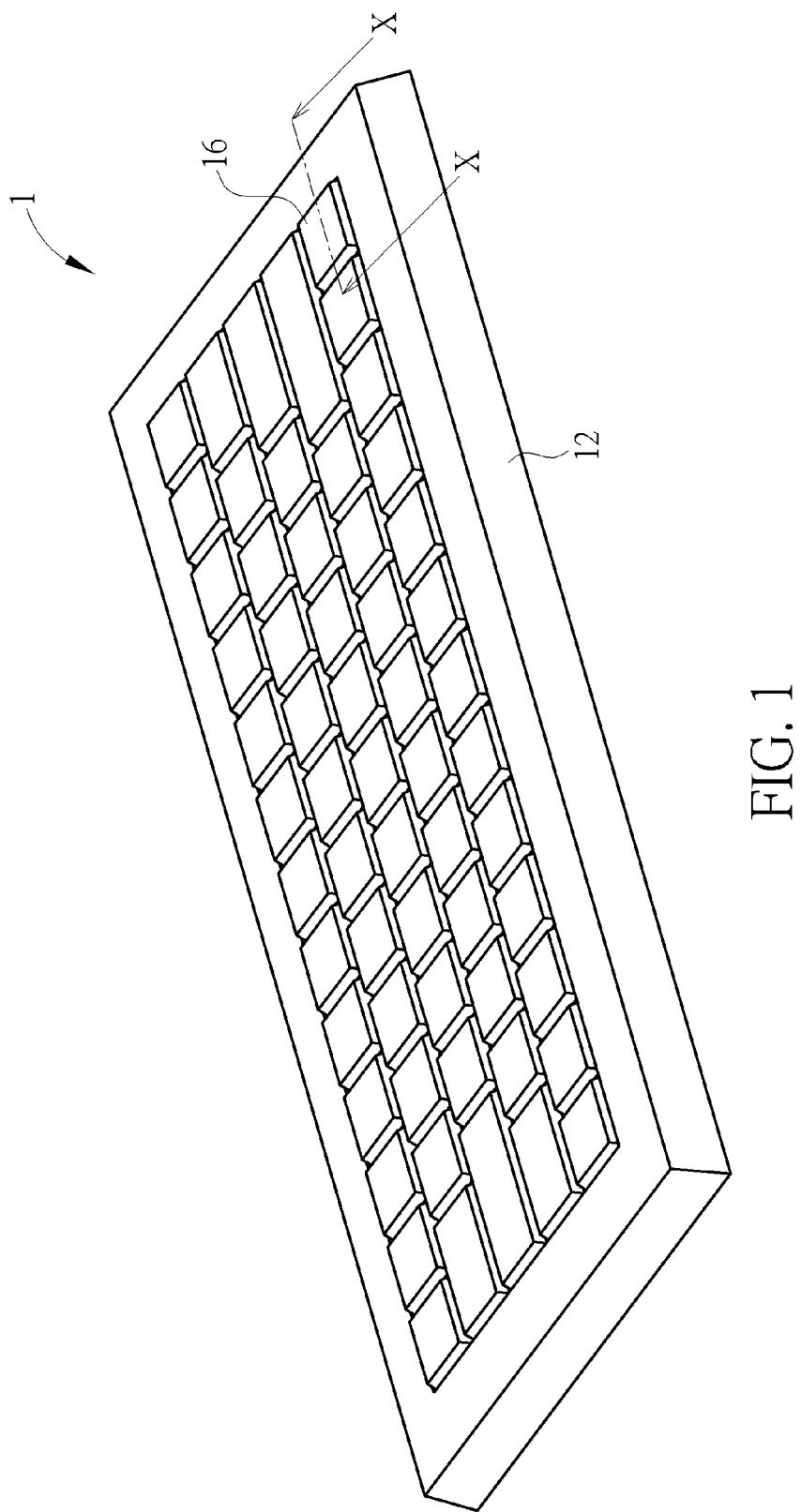
FIG. 1 is a schematic diagram illustrating a keyboard with back light of a preferred embodiment according to the invention.
Figure 2:
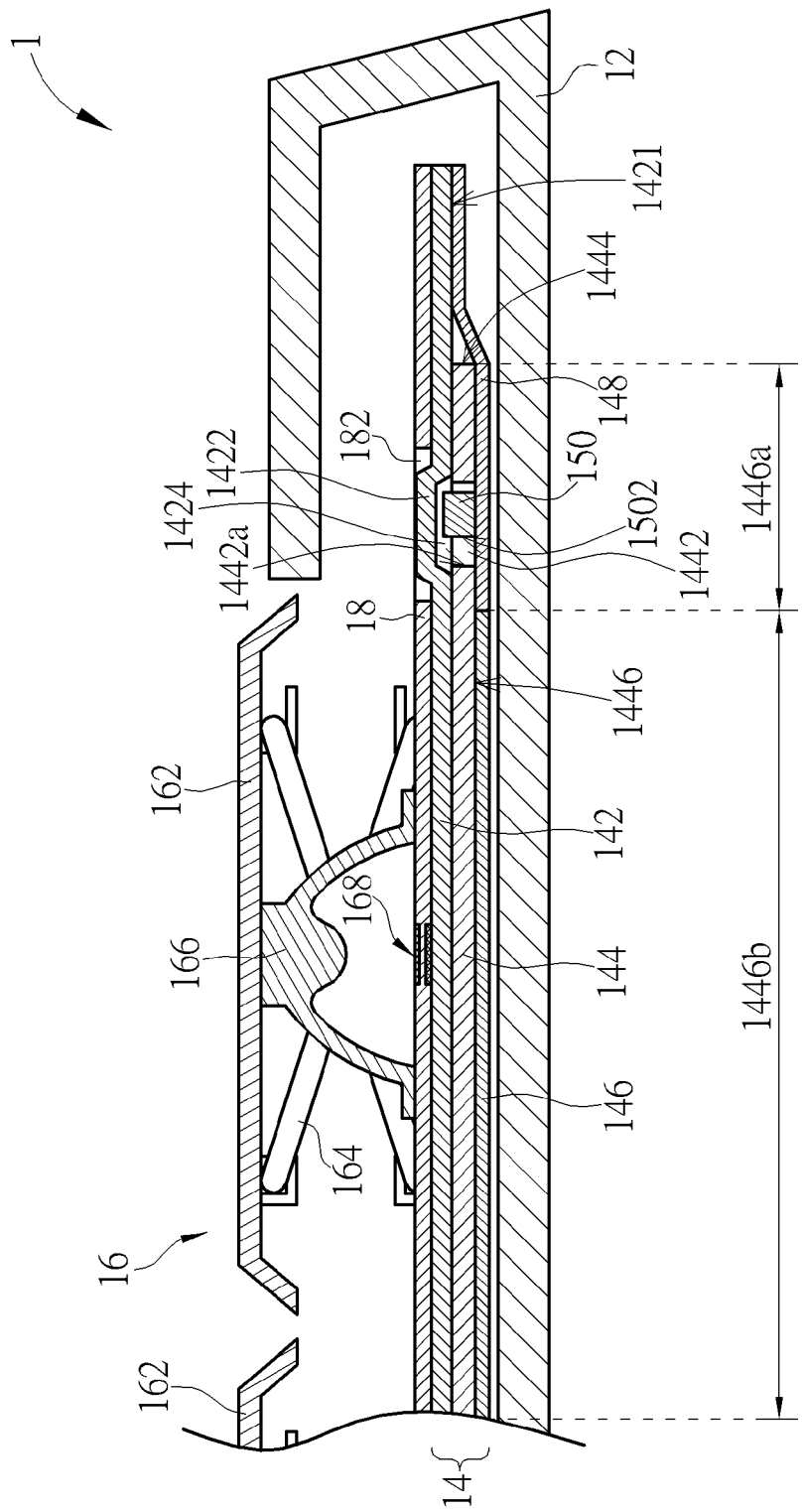
FIG. 2 is a sectional view of the keyboard with back light in FIG. 1 along the line X-X.

Please refer to FIG. 1 and FIG. 2. FIG. 1 is a schematic diagram illustrating a keyboard with back light 1 of a preferred embodiment according to the invention. FIG. 2 is a sectional view of the keyboard with back light 1 along the line X-X in FIG. 1. The keyboard with back light 1 includes a casing 12, a back light structure 14, and a plurality of keyswitch structures 16. The back light structure 14 and the keyswitch structures 16 are accommodated in the casing 12. The keyswitch structures 16 are exposed out of the casing 12 for a user to press. The back light structure 14 includes a supporting plate 142, a light guiding plate 144, a light reflection sheet 146, a flexible circuit board 148, and a light-emitting component 150. Each keyswitch structure 16 is disposed on the supporting plate 142 and includes a keycap 162, a lift mechanism 164, a resilient dome 166, and a switch 168. The keycap 162 is disposed above the supporting plate 142 and exposed out of the casing 12. The lift mechanism 164 connects the keycap 162 and the supporting plate 142 such that the keycap 162 is capable of moving up and down relative to the supporting plate 142 through the lift mechanism 164. The resilient dome 166 is disposed under the keycap 162. The switch 168 is disposed under the resilient dome 166 such that when the keycap 162 is pressed, the keycap 162 can press the resilient dome 166 to trigger the switch 168. The elastically-deformed resilient dome 166 produces a resilient force to urge the keycap 162 to move upward for back to its original position. In practice, the switches 168 are realized by a membrane circuit board 18, but the invention is not limited thereto.

The light guiding plate 144 is disposed under the supporting plate 142 and has a through hole 1442 and a lateral surface 1444. The flexible circuit board 148 adheres onto a lower surface 1446 of the light guiding plate 144 and a bottom surface 1421 of the supporting plate 142 and covers the lateral surface 1444; therein, the flexible circuit board 148 is not limited to totally adhering onto the lateral surface 1444. The light-emitting component 150 is disposed on the flexible circuit board 148 and located in the through hole 1442 such that light for illumination (i.e. illumination light) provided by the light-emitting component 150 can enter the light guiding plate. Thereby, the flexible circuit board 148 is directly used to avoid light leakage from the lateral surface 1444 of the light guiding plate 144, so another member for avoidance of light leakage, for example the conventional light reflection sheet covering the side edge of the light guiding plate, is unnecessary. Therefore, the thickness of the back light structure 14 at this location can be thinner than that of the conventional back light structure at the corresponding location, which is conducive to miniaturization design for keyboard. In addition, the light reflection sheet 146 adheres onto the lower surface 1446 of the light guiding plate 144 and is closely adjacent to the flexible circuit board 148. Thereby, light leakage from the lower surface 1446 of the light guiding plate 144 also can be prevented. In another aspect, the lower surface 1446 includes a first area 1446a and a second area 1446b. The first area 1446a is closely adjacent to the second area 1446b. In practice, the first area 1446a is usually located at an edge portion of the lower surface 1446. The second area 1446b can be defined to be the area not belonging to the first area 1446a, but the invention is not limited thereto. Therein, the first area 1446a has the through hole 1442. The flexible circuit board 148 substantially covers the whole first area 1446a. The light reflection sheet 146 substantially covers the whole second area 1446b. Thereby, the illumination light escaping from the first area 1446a and the second area 1446b of the light guiding plate 144 can be reflected back to the light guiding plate 144. Therefore, the light reflection sheet 146 and the flexible circuit board 148 of the back light structure 14 can avoid light leakage from the lower surface 1446 and the lateral surface 1444 of the light guiding plate 144 without overlapping, so that the thickness of the back light structure 14 can be thinner than that of the conventional back light structure, which is conducive to miniaturization design for keyboard.

In the embodiment, the light-emitting component 150 is of a side lighting type. The light-emitting component 150 has a side light-emitting surface 1502 toward an inner sidewall surface 1442a of the through hole 1442, such that the light (i.e. the illumination light) emitted from side light-emitting surface 1502 by the light-emitting component 150 can mostly enter the light guiding plate 144 through the inner sidewall surface 1442a. In general, the side-lighting light-emitting component 150 has a higher height. When the thickness of the light guiding plate 144 is relatively thinner, a component above the light guiding plate 144 needs to provide space for avoiding structural interference. In the embodiment, the supporting plate 142 disposed above the light guiding plate 144 has a raised structure 1422 for forming a relief recess 1424 communicating with the through hole 1442. The light-emitting component 150 can be partially accommodated in the relief recess 1424 for avoiding a structural interference with the supporting plate 142. In practice, for avoiding a protrusion of the membrane circuit board 18, disposed above the supporting plate 142, at the raised structure 1422, the membrane circuit board 18 can has a through hole 182 at a portion corresponding to the raised structure 1422, such that the raised structure 1422 is partially accommodated in the through hole 182 for avoiding a protrusion due to a structural interference with the membrane circuit board 18.

Figure 3:
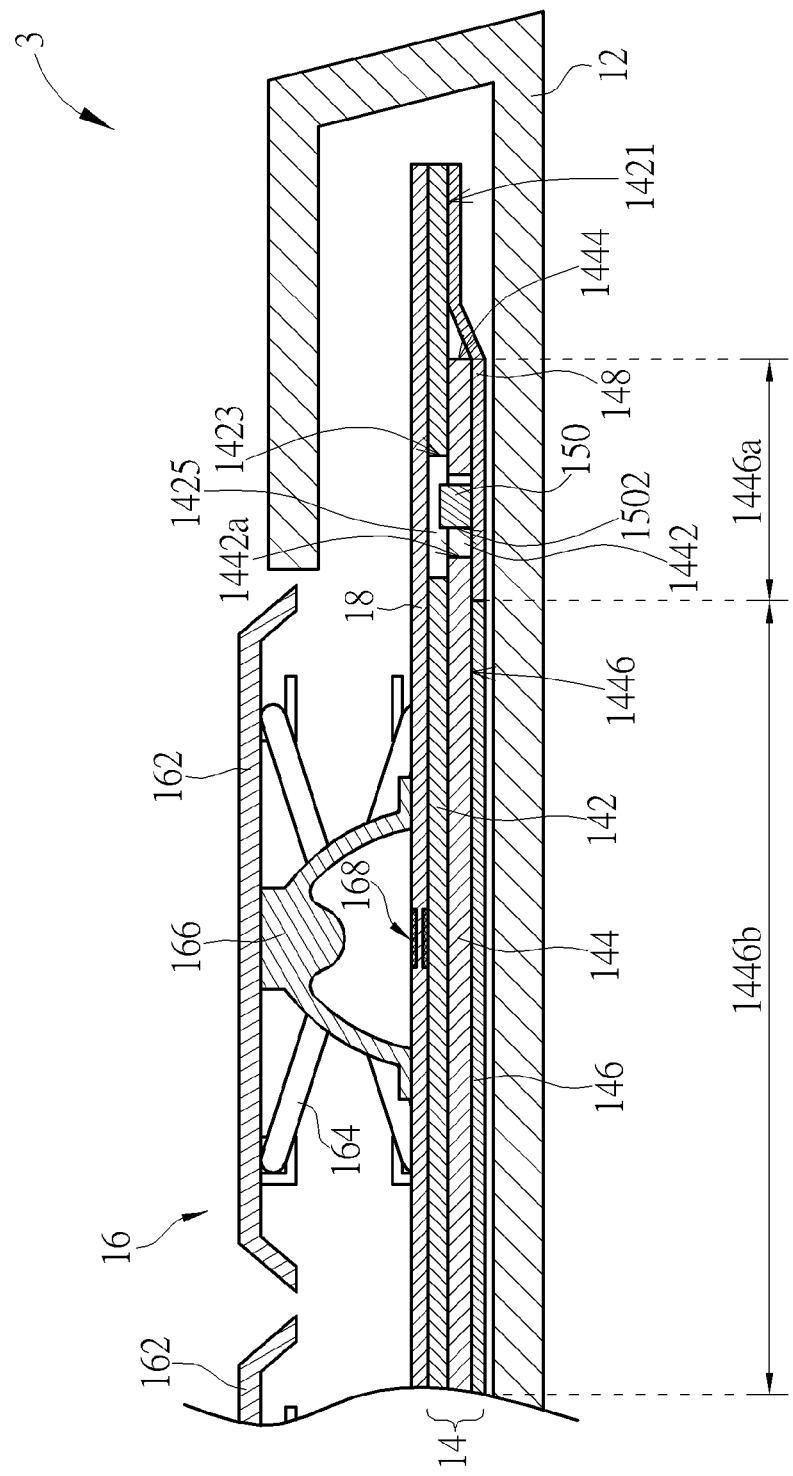
FIG. 3 is a sectional view of a keyboard with back light of another embodiment.

Please refer to FIG. 3, which is a sectional view of a keyboard with back light 3 of another embodiment; the cutting position thereof can be indicated by the line X-X in FIG. 1. The keyboard with back light 3 is substantially structurally equal to the keyboard with back light 1, so the keyboard with back light 3 still uses component notations of the keyboard with back light 1 in principle. The main difference between the keyboard with back light 3 and the keyboard with back light 1 is that in the keyboard with back light 3, a relief recess 1425 of the supporting plate 142 is realized directly by a through hole 1423. The light-emitting component 150 is partially accommodated in the relief recess 1425 formed by the through hole 1423. Therefore, the supporting plate 142 of the keyboard with back light 3 does not need the raised structure 1422 of the keyboard with backlight 1; the membrane circuit board 18 of the keyboard with back light 3 does not need the hole 182 of the keyboard with back light 1 either. It is added that in the embodiment, generally the accommodating space formed by the through hole 1442 of the light guiding plate 144 and the through hole 1423 of the supporting plate 142 is enough to accommodate the light-emitting component 150, so the membrane circuit board 18 need not to have another hole for avoidance of reference further; however, the invention is not limited thereto.

Figure 4:
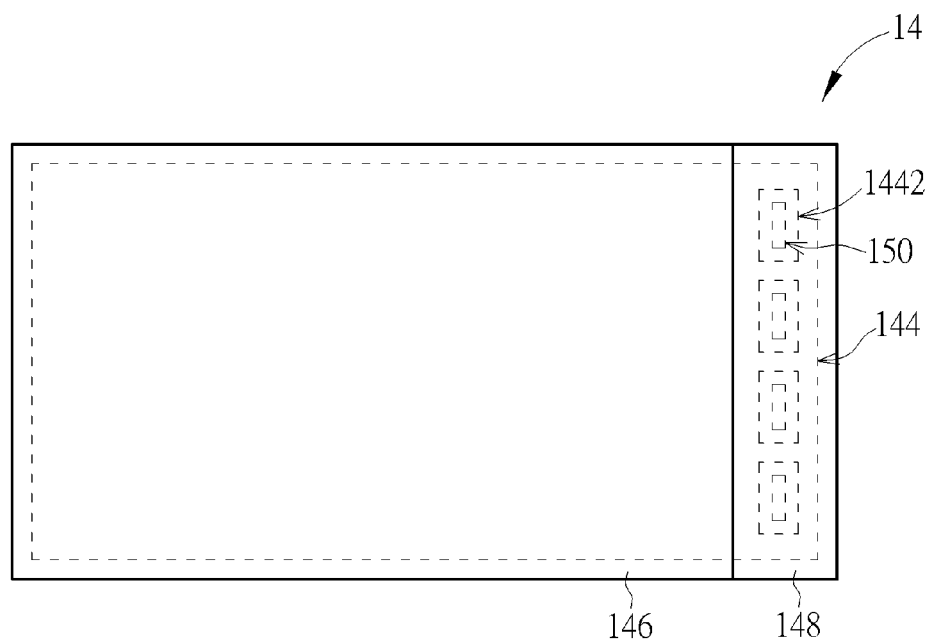
FIG. 4 is a bottom view of a back light structure of the keyboard with back light in FIG. 1.
Figure 5:
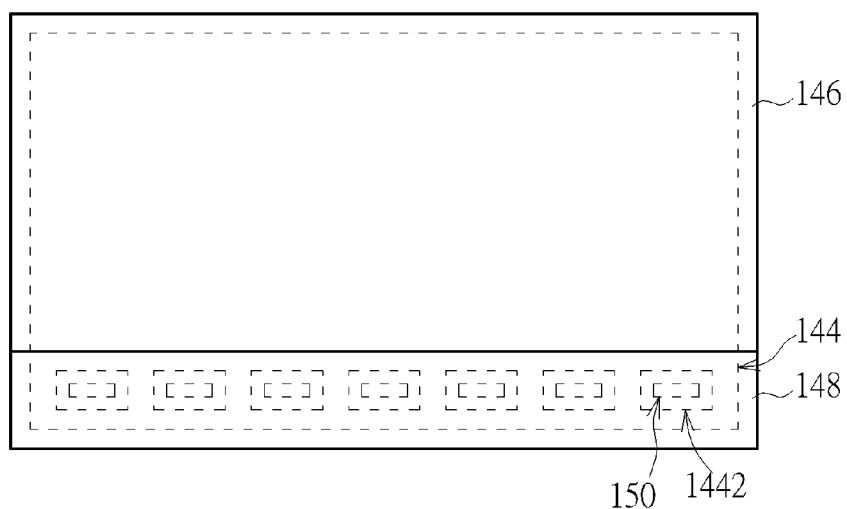
FIG. 5 is a bottom view of a back light structure according to another embodiment.

In the above embodiments, the keyboard with back light 1 has a rectangle profile substantially. The flexible circuit board 148 is located at the short edge of the rectangle profile. Please refer to FIG. 4, which is a bottom view of the back light structure 14. In practice, the coverage area of the light reflection sheet 146 and the flexible circuit board 148 is larger than the area of the light guiding plate 144 but similar to the area of the supporting plate 142, so the light guiding plate 144 and the light-emitting components 150 are shown in dashed lines in FIG. 4. The light-emitting components 150 are disposed only at right side of the light guiding plate 144, but the invention is not limited thereto. For example, the back light structure 14 can be provided with another set of the flexible circuit board 148 and the light-emitting components 150 disposed at the opposite side, i.e. the left side of the light guiding plate 144. For another example, as shown by FIG. 5, the flexible circuit board 148 and the light-emitting components 150 are disposed at the bottom side of the light guiding plate 144. In practice, the disposition of the flexible circuit board 148 and the light-emitting components 150 in FIG. 5 can be altered to be at the top side of the light guiding plate 144, or two sets of the flexible circuit board 148 and the light-emitting components 150 are configured at both the top and bottom sides of the light guiding plate 144. However, the invention is not limited thereto.

As discussed above, the back light structure and the keyboard with back light of the invention directly use the flexible circuit board to cover the lateral surface of the light guiding plate for avoiding light leakage from the lateral surface of the light guiding plate, so it is unnecessary for the light reflection sheet to also cover the lateral surface. The light reflection sheet can adhere onto the lower surface of the light guiding plate and be closely adjacent to the flexible circuit board, which also avoiding light leakage from the light guiding plate between the light reflection sheet and the flexible circuit board. Therefore, compared with the prior art, the light reflection sheet of the back light structure of the invention need not cover the flexible circuit board, so the structural thickness of the back light structure can be reduced, which overcomes the bottleneck in the conventional back light structure that it is difficult to reduce the structural thickness due to the summation of the thicknesses at least of the light guiding plate, the flexible circuit board, the light reflection sheet, and so on.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A back light structure for a keyboard with back light, the keyboard with back light comprising a plurality of keyswitch structures, the back light structure comprising:
   a supporting plate for supporting the plurality of the keyswitch structures, the supporting plate having a bottom surface;
   a light guiding plate disposed under the supporting plate, the light guiding plate having a first through hole, a lower surface, and a lateral surface;
   a flexible circuit board adhering onto both the lower surface of the light guiding plate and the bottom surface of the supporting plate and covering the lateral surface; and
   a light-emitting component disposed on the flexible circuit board and located in the first through hole.

2. The back light structure of claim 1, wherein the light-emitting component has a side light-emitting surface toward an inner sidewall surface of the first through hole.

3. The back light structure of claim 1, wherein the supporting plate has a relief recess, the first through hole communicates with the relief recess, and the light-emitting component is partially accommodating in the relief recess.

4. The back light structure of claim 3, wherein the supporting plate has a raised structure for forming the relief recess.

5. The back light structure of claim 3, wherein the supporting plate has a hole for forming the relief recess.

6. The back light structure of claim 1, further comprising a light reflection sheet adhering onto the lower surface of the light guiding plate.

7. The back light structure of claim 6, wherein the light reflection sheet is closely adjacent to the flexible circuit board, and a boundary is formed between the light reflection sheet and the flexible circuit board, so that substantially no light leaks out from the boundary.

8. A keyboard with back light, comprising:
   a supporting plate, the supporting plate having a bottom surface;
   a plurality of keyswitch structures disposed on the supporting plate;
   a light guiding plate disposed under the supporting plate, the light guiding plate having a first through hole, a lower surface, and a lateral surface;
   a flexible circuit board adhering onto both the lower surface of the light guiding plate and the bottom surface of the supporting plate and covering the lateral surface; and
   a light-emitting component disposed on the flexible circuit board and located in the first through hole.

9. The keyboard with back light of claim 8, wherein the light-emitting component has a side light-emitting surface toward an inner sidewall surface of the first through hole.

10. The keyboard with back light of claim 8, wherein the supporting plate has a relief recess communicating with the first through hole, and the light-emitting component is partially accommodated in the relief recess.

11. The keyboard with back light of claim 10, further comprising a membrane circuit board disposed above the supporting plate, wherein the supporting plate has a raised structure for forming the relief recess, the membrane circuit board has a second through hole, and the raised structure is partially accommodated in the second through hole.

12. The keyboard with back light of claim 10, wherein the supporting plate has a hole for forming the relief recess.

13. The keyboard with back light of claim 8, further comprising a light reflection sheet adhering onto the lower surface of the light guiding plate.

14. The keyboard with back light of claim 13, wherein the light reflection sheet is closely adjacent to the flexible circuit board.

15. A keyboard with back light, comprising:
   a supporting plate, the supporting plate having a relief recess;
   a plurality of keyswitch structures disposed on the supporting plate;
   a light guiding plate disposed under the supporting plate, a lower surface of the light guiding plate comprising a first area and a second area, the first area being closely adjacent to the second area, the first area having a first through hole, the first through hole communicating with the relief recess;
   a flexible circuit board substantially covering the whole first area;
   a light-emitting component disposed on the flexible circuit board and located in the first through hole, the light-emitting component being partially accommodated in the relief recess, the light-emitting component providing illumination light capable of entering the light guiding plate; and
   a light reflection sheet substantially covering the whole second area, wherein the illumination light escaping from the first area and the second area of the light guiding plate is reflected back to the light guiding plate by the light reflection sheet and the flexible circuit board, and substantially no light leaks out from a boundary formed between the light reflection sheet and the flexible circuit board.

16. The keyboard with back light of claim 15, further comprising a membrane circuit board disposed above the supporting plate, wherein the supporting plate has a raised structure for forming the relief recess, the membrane circuit board has a second through hole, and the raised structure is partially accommodated in the second through hole.

17. The keyboard with back light of claim 15, wherein the supporting plate has a hole for forming the relief recess.

* * * * *

UNITED STATES PATENT AND TRADEMARK OFFICE
CERTIFICATE OF CORRECTION

PATENT NO. : 9,477,027 B2
APPLICATION NO. : 14/160485
DATED : October 25, 2016
INVENTOR(S) : Tsai Page 1 of 1

It is certified that error appears in the above-identified patent and that said Letters Patent is hereby corrected as shown below:

On the Title Page

Item (71), delete "Jiangsu Province (TW)" and insert --Jiangsu Province (CN)--.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*